United States Patent [19]

Matsuura et al.

[11] 3,714,055
[45] Jan. 30, 1973

[54] GLASS COLOR FILTERS FOR USE UNDER WHITE AND WARM WHITE FLUORESCENT LIGHTS

[75] Inventors: Takashi Matsuura; Mitsuo Chikano, both of Tokyo, Japan

[73] Assignee: Hoya Glass Works, Tokyo, Japan

[22] Filed: Sept. 17, 1971

[21] Appl. No.: 181,494

[30] Foreign Application Priority Data

Sept. 18, 1970 Japan................45/81804

[52] U.S. Cl..................................252/300, 106/53
[51] Int. Cl. ..........F21u 9/00, C03c 3/04, C03c 3/10
[58] Field of Search...106/53, 47 Q, 54, 52; 252/300, 252/301.4 F

[56] References Cited

UNITED STATES PATENTS

| | | | |
|---|---|---|---|
| 1,331,937 | 2/1920 | Luckiesh et al. | 106/52 |
| 2,378,769 | 6/1945 | Hood | 106/54 |
| 3,143,683 | 8/1964 | Duncan et al. | 106/52 |
| 3,314,817 | 4/1967 | Tiede | 106/54 |
| 3,457,183 | 7/1969 | Lee, Jr. et al. | 106/52 |

*Primary Examiner*—James E. Poer
*Assistant Examiner*—M. Bell
*Attorney*—Sughrue, Rothwell, Mion, Zinn & Macpeak

[57] ABSTRACT

Glass color filters suitable for use in color photography under white and warm white fluorescent lights are prepared from a glass composition comprising 100 parts of base glass composed of, by weight, 47.0 – 60.0 percent silicic acid anhydride, 0 – 5.0 percent boric acid anhydride, 10.0 – 24.0 percent of either one or both of sodium oxide and potassium oxide, 3.0 – 7.0 percent calcium oxide, 18.0 – 35.0 percent of either one or both of barium oxide and lead oxide, and 0.2 – 0.5 percent arsenic oxide, and a coloring agent composed of, by weight, 0.5 – 1.8 percent manganese dioxide, 0 – 0.8 % copper oxide, and 0.3 – 2.5 percent neodymium oxide.

1 Claim, 2 Drawing Figures

GLASS COLOR FILTERS FOR USE UNDER WHITE AND WARM WHITE FLUORESCENT LIGHTS

BACKGROUND OF THE INVENTION

It is well known that daylight-type color photographic films reproduce correct colors when exposed to natural light (sunlight), but under different illuminating conditions, the properties of light change, and the films do not give correct color reproduction. When the color temperature of a given light does not correspond with that of the color photographic film, it is common practice to correct the color reproduction in color photography by mounting a color temperature elevating or decreasing filter in a camera.

FIELD OF THE INVENTION

This invention relates to a glass color filter for use in taking color photographs under white and warm white fluorescent lights.

BRIEF DESCRIPTION OF THE DRAWINGS

In the accompanying drawings.

DESCRIPTION OF THE INVENTION

Figure 1:
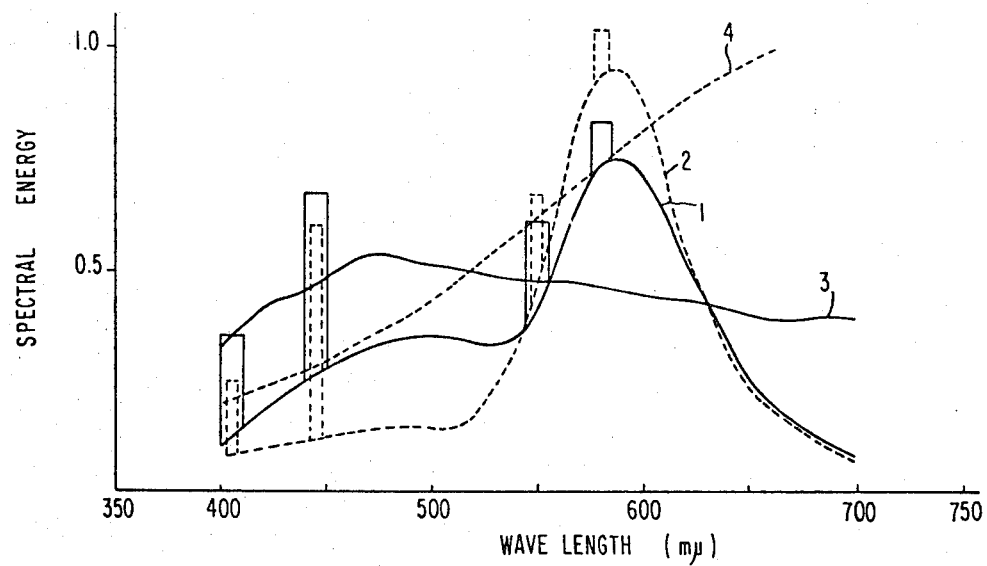
FIG. 1 is a diagram showing the spectral energy distribution curves of sunlight, electric light, and white and warm white fluorescent light.

As shown by curves 1 and 2 in FIG. 1, the spectral energy distribution curve of the white and warm white fluorescent light differs greatly from the spectral energy distribution curve 3 of sunlight, and it is well known that when a color photograph is taken without using a color filter, the resulting photograph becomes blue-greenish. It is clear, therefore, that color correcting filters are necessary for taking color photographs under the illumination of white and warm white fluorescent lamps. Furthermore, FIG. 1 shows that unlike the spectral energy distribution curve 4 of electric light, the spectral energy distribution curve of fluorescent light has sharp bright line spectra in the vicinity of 400, 450, 550, and 580m$\mu$. This indicates that a simple color temperature converting filter does not serve to give correct color reproduction.

Figure 2:
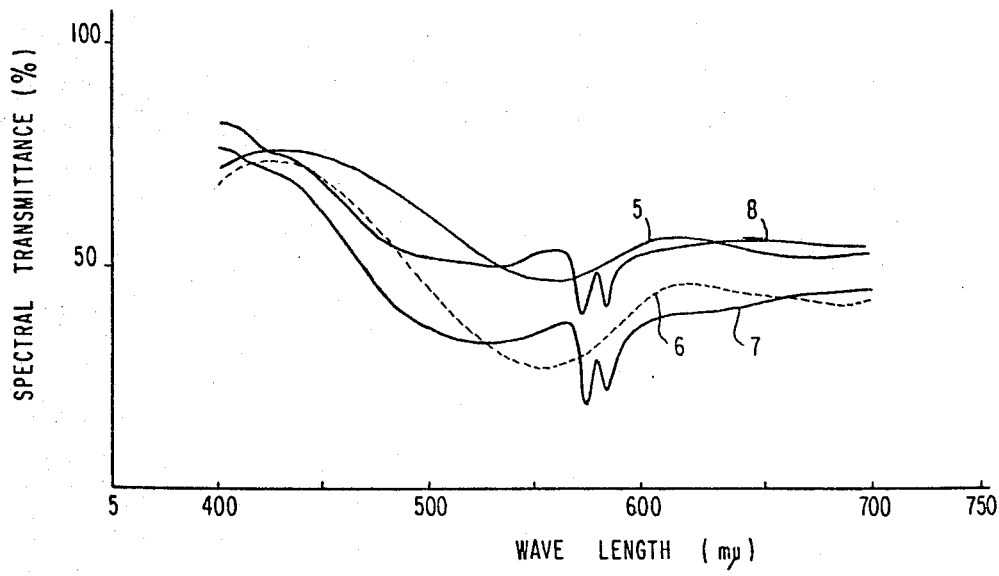
FIG. 2 is a diagram showing the spectral transmittance curves of the glass color filter of the present invention and a gelatin filter.

Gelatin filters which perform nearly good color correction corresponding to the respective fluorescent lamps have previously been proposed (see FIG. 2). However, color correction with such gelatin filters is not sufficient, and there are defects such as poor flatness caused by the lamination of a plurality of filter elements, or marked color fading because of its organic nature. On the other hand, it has been considered impossible to produce glass filters having such a spectral transmittance curve.

We have made extensive studies on ideal color filters based on the spectral energy distribution curve of fluorescent lamps and the spectral sensitivity curve of a color photographic film, and also on the composition of glass. This finally led to successful production of a stable glass color filter which is free from color fading and has superior color reproducibility as compared with the gelatin filter, when used in taking color photographs under the illumination of the white and warm white fluorescent lights using daylight-type color photographic films.

In FIG. 2, curves 5 and 6 are the spectral transmittance curves of the gelatin filters which are considered to show good color reproduction when used in taking color photographs of the daylight-type under the illumination of white and warm white fluorescent lights respectively. Our work has revealed that color reproduction in color photography under the illumination of white and warm white fluorescent lamps using daylight-type color photographic films is markedly improved by stepwise reducing the spectral transmittance of the color filter at a green region (500–600m$\mu$) and a red region (600–700m$\mu$) according to the kind of light source for color photography without reducing the transmittance of a blue region (400–500m$\mu$) as much as possible, and selectively reducing the bright line spectrum in the vicinity of 580 m$\mu$ of the fluorescent lamps as shown in FIG. 1.

Accordingly, an object of the present invention is to provide a glass color filter whose spectral transmittance curve meets these requirements.

According to the invention, there is provided a glass color filter for use under white and warm white fluorescent lights, said glass filter consisting essentially of 100 parts of base glass composed of, by weight, 47.0–60.0 percent silicic acid anhydride, 0–5.0 percent boric acid anhydride, 10.0–24.0 percent of either one or both of sodium oxide and potassium oxide, 3.0–7.0 percent calcium oxide, 18.0–35.0 percent of either one or both of barium oxide and lead oxide, and 0.2–0.5 percent arsenic oxide and a coloring agent composed of, by weight, 0.5–1.8 percent manganese dioxide, 0–0.8 percent copper oxide, and 0.3–2.5 percent neodymium oxide.

The glass filter is obtained by melting a glass batch consisting of the above ingredients at about 1,400° C in air in a customary manner. The resulting glass filter has a spectral transmittance curve shown by curve 7 in FIG. 2 for use under white fluorescent light, and by curve 8 for use under warm white fluorescent light.

Silicic acid anhydride or silicon dioxide is a principal ingredient of the glass filter of the invention. If it is used in an amount of more than 60 percent of the base glass, the glass batch becomes difficult to melt, and the resulting glass is unsuitable for optical uses because of imperfections such as bubbles or striae. If the amount is below 47 percent, the resulting glass has poor weather resistance and is not feasible.

Boric acid anhydride improves the meltability of the glass batch and the weather resistance of the resulting glass. These effects, however, are not produced if its amount is above 5.0 percent. In the case of adding copper oxide as a coloring agent, such an excess amount causes an excessively large absorption in a blue region.

Sodium oxide and potassium oxide are essential ingredients for glass formation, and are important for increasing the transmittance of manganese dioxide coloring agent at the blue region. Amounts below 10 percent give no significant effect, and when the amount exceeds 24 percent, undesirable phenomena occur such as the dissolution of vitrified alkali.

Calcium oxide has an effect of increasing the weather resistance of the resulting glass. Amounts below 3 percent do not produce the effect, and amounts above 7 percent cause an increase in the viscosity of glass batch and consequent difficulty of melting.

Barium oxide and lead oxide are the characteristic features of the glass according to the invention, and serve to improve the absorbing properties of manganese dioxide and maintain it in a stable condition in the glass. The absorption of manganese dioxide in lime base glass is at about 500 m$\mu$, and the absorption at the blue and red regions is also relatively large. Thus, there is a failure in balance among the blue, green and red absorptions. By adding barium oxide and/or lead oxide, however, the absorbing position shifts to the vicinity of 520 m$\mu$, and the transmittance of manganese dioxide at the blue region is improved. The addition of barium oxide and/or lead oxide is also effective for preventing the absorption of copper oxide at the red region from becoming excessive. If the amount of barium oxide and/or lead oxide is below 18 percent, the above effect is hardly obtained, and amounts above 35 percent will bring about no significant increase in the effect.

Arsenic oxide is added as a clarifying agent. Its amount is adjusted according to the contents of the other ingredients, and the object is achieved by using it in an amount of 0.2 to 0.5 percent.

The spectral characteristics of the glass filter of the present invention, although differing according to the kind of fluorescent light used, are that the transmittance at the blue region is maximum, and part of light in the green and red regions is absorbed, and the light in the vicinity of 580 m$\mu$ is selectively absorbed (visually, the color is blue violet). In order to impart these properties to the glass, manganese dioxide is used to absorb light in the green region and some of the red region. Copper oxide is added in order to supplement the red region absorption of manganese oxide when it is necessary to change the absorption ratio between the green region and the red region as in the case of a color filter for use under warm white fluorescent light. Neodymium has a sharp absorption in the vicinity of 580 m$\mu$, and proves very effective for absorbing only bright line spectrum in the vicinity of 580 m$\mu$ of fluorescent light. The amounts of the coloring components should be changed so as to maintain the spectral transmittance curve constant with varying thickness of the glass.

Some examples of the glass filter according to the invention will be shown below. In each of the examples, the following ingredients were melted in a crucible, and formed into glass by a well-known manner.

| Ingredients | Examples | | | |
|---|---|---|---|---|
| | 1 | 2 | 3 | 4 |
| Silicic acid anhydride | 49.9% | 56.8% | 54.8% | 48.9% |
| Boric acid anhydride | 3.0 | 0 | 0 | 0 |
| Sodium oxide | 3.0 | 4.0 | 5.0 | 4.0 |
| Potassium oxide | 12.9 | 13.9 | 15.9 | 8.0 |
| Calcium oxide | 4.0 | 5.0 | 4.0 | 6.0 |
| Barium oxide | 0 | 19.9 | 14.9 | 2.0 |
| Lead oxide | 26.9 | 0 | 5.0 | 30.9 |
| Arsenic oxide | 0.3 | 0.4 | 0.4 | 0.3 |
| Manganese dioxide | 1.5 | 1.7 | 1.1 | 0.9 |
| Copper oxide | 0 | 0.02 | 0.3 | 0.2 |
| Neodymium oxide | 1.6 | 1.4 | 1.8 | 1.8 |

The glasses obtained in these Examples were optically polished to a thickness of 2.5 mm, and the spectral transmittance was measured. In Examples 1 and 2, there was obtained glass having a spectral transmittance represented by curve 7 in FIG. 2, which was most suitable as a color filter for use under white florescent light. In Examples 3 and 4, there was obtained glass having a spectral transmittance represented by curve 8 in FIG. 2, which was most suitable as a color filter for use under warm white fluorescent light.

The glass color filters obtained in these Examples are better in color reproducibility than the gelatin color filters, and also have the advantage that flatness can be easily obtained and they are free from degeneration and deterioration over long periods of time.

What is claimed is:

1. A glass color filter for use under white and warm white fluorescent lights, said filter consisting essentially of 100 parts of base glass composed of, by weight, 47.0–60.0 percent silicic acid anhydride, 0–5.0 percent boric acid anhydride, 10.0–24.0 percent of either one or both of sodium oxide and potassium oxide, 3.0–7.0 percent calcium oxide, 18.0–35.0 percent of either one or both of barium oxide and lead oxide, and 0.2–0.5 percent arsenic oxide, and a coloring agent composed of, by weight, 0.5–1.8 percent manganese dioxide, 0–0.8 percent copper oxide, and 0.3–2.5 percent neodymium oxide.

* * * * *